(12) United States Patent
Mineshima

(10) Patent No.: US 11,548,460 B2
(45) Date of Patent: Jan. 10, 2023

(54) CONNECTING STRUCTURE FOR EXTERIOR MEMBERS

(71) Applicant: HONDA MOTOR CO., LTD., Tokyo (JP)

(72) Inventor: Kohei Mineshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 17/127,067

(22) Filed: Dec. 18, 2020

(65) Prior Publication Data
US 2021/0188203 A1 Jun. 24, 2021

(30) Foreign Application Priority Data

Dec. 20, 2019 (JP) .............................. JP2019-230055

(51) Int. Cl.
*B60R 19/24* (2006.01)
(52) U.S. Cl.
CPC .................................... *B60R 19/24* (2013.01)
(58) Field of Classification Search
CPC ..................................................... B60R 19/24
See application file for complete search history.

(56) References Cited

U.S. PATENT DOCUMENTS

| | | | | |
|---|---|---|---|---|
| 5,061,108 A | * | 10/1991 | Bien | F16B 21/09 296/29 |
| 5,882,054 A | | 3/1999 | Devilliers et al. | |
| 7,488,032 B2 | * | 2/2009 | Thakar | B62D 25/163 296/198 |

FOREIGN PATENT DOCUMENTS

| | | |
|---|---|---|
| JP | H06-42451 U | 6/1994 |
| JP | 2000-103301 A | 4/2000 |
| JP | 2002-274284 A | 9/2002 |
| JP | 2008-105474 A | 5/2008 |
| JP | 2009-029252 A | 2/2009 |
| JP | 2018-103805 A | 7/2018 |

OTHER PUBLICATIONS

Office Action received in corresponding Japanese application No. 2019-230055 dated Mar. 22, 2022 with English translation (7 pages).

* cited by examiner

*Primary Examiner* — D Glenn Dayoan
*Assistant Examiner* — Melissa Ann Bonifazi
(74) *Attorney, Agent, or Firm* — Rankin, Hill & Clark LLP

(57) ABSTRACT

A connecting structure for exterior members includes: a first exterior member provided on a vehicle body; a second exterior member disposed adjacent to the first exterior member; an engaging portion provided on one of the first and second exterior members; and an engaged portion provided on the other one of the first and second exterior members. The connecting structure has a parting line formed between the first exterior member and the second exterior member by disposing the second exterior member on the vehicle body adjacent to the first exterior member. Sliding one of the first and second exterior members relative to the other one of the first and second exterior members along, the parting line causes the engaging portion and the engaged portion to be brought into engagement with each other in a direction intersecting a sliding direction of the one of the first and second exterior members.

11 Claims, 6 Drawing Sheets

CONNECTING STRUCTURE FOR EXTERIOR MEMBERS

CROSS-REFERENCE TO RELATED APPLICATION

This application claims the benefit of foreign priority to Japanese Patent Application No. 2019-230055, filed on Dec. 20, 2019, which is incorporated by reference in its entirety.

TECHNICAL FIELD

The present invention relates to a connecting structure for exterior members.

BACKGROUND

A connecting structure for exterior members is conventionally known, for example from JP 2000-103301 A, in which a bumper side member as an example of an exterior member of a vehicle is fitted in a position adjacent to a fender member as an example of an exterior member of the vehicle.

In this structure, a clip attachment portion is provided on the reverse side of the bumper side member. Further, a clip member to be inserted into the clip attachment portion is attached to the front edge portion of the fender.

The clip member is slid in a direction intersecting a parting line, so that the clip member is inserted into the clip attachment portion. This makes it possible to attach the bumper side member at a position where the fender member is disposed.

However, the above-described conventional connecting structure for the exterior members is configured such that the clip member is slid and fitted in a direction intersecting the parting line, that is a direction approaching the fender member. Accordingly, the gap size of the parting line may vary. It is therefore difficult to attach the exterior members in accurate positions, and further improvement is required.

It is therefore an object of the present invention to provide a connecting structure for exterior members, which can be assembled with ease and can reduce assembly tolerances.

SUMMARY

A connecting structure for exterior members according to the present invention comprise a first exterior member provided on a vehicle body: a Second exterior member disposed adjacent to the first exterior member; an engaging portion provided on one of the first exterior member and the second exterior Member; and an engaged portion provided on the other one of the first exterior member and the second exterior member, wherein the connecting structure has a parting line formed between the first exterior member and the second exterior member by disposing the second exterior member on the vehicle body adjacent to the first exterior member, and Wherein sliding one of the first exterior member and the second exterior member relative to the other one of the first exterior member and the second exterior member along the parting line causes the engaging portion and the engaged portion to be brought into engagement with each, other in a direction intersecting a sliding direction of the one of the first exterior member and the second exterior member.

BRIEF DESCRIPTION OF THE DRAWINGS

The drawings described herein are for illustration purposes only and are not intended to limit the scope of the present invention in any way.

DETAILED DESCRIPTION

Figure 1:
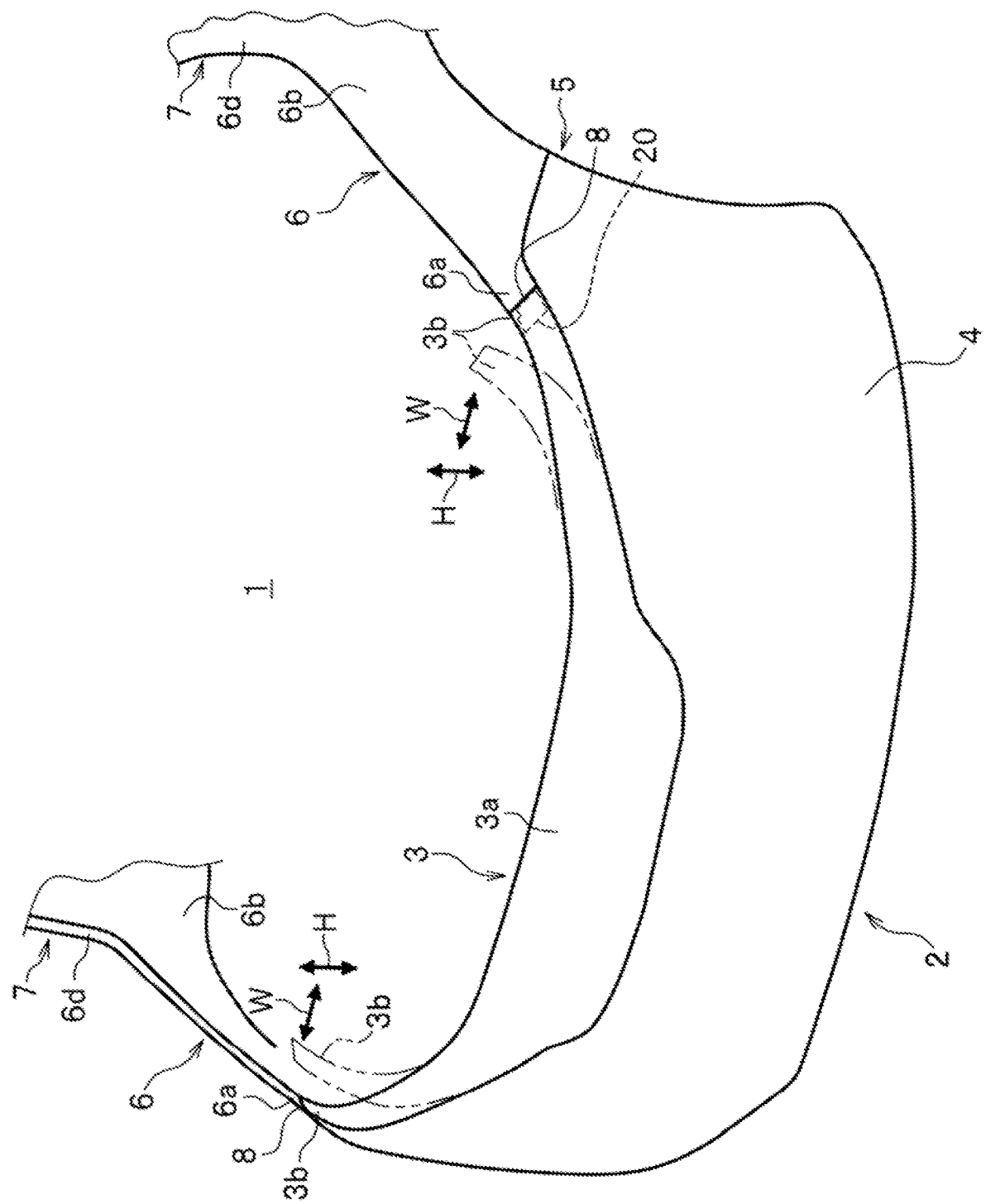
FIG. 1 is a perspective view illustrating a connecting structure for exterior members according to one embodiment of the present invention that is applied to a vehicle body front portion of a vehicle.

One embodiment of the present invention will be described below with reference to the accompanying drawings where appropriate. The same or similar parts are designated with the same reference numerals and duplicated descriptions thereof will be omitted, Unless otherwise stated, directions such as front, rear, right, left, upper and lower basically correspond to the directions as seen from a driver. It should be noted that "vehicle width direction" and "lateral direction (right-left direction)" are interchangeable.

FIG. 1 is a perspective view illustrating a connecting structure for exterior members according to a basic embodiment of the present invention that is applied to a vehicle body front portion of a vehicle.

A vehicle according to this embodiment includes a front bumper 4 supported by a structure of a front portion 2 of a vehicle both 1. Provided at an upper edge of the hoot bumper 4 is a bumper garnish 3 that is a garnish as an example of a first exterior member. A fender 6 as an example of a second exterior member is disposed adjacent to the bumper garnish 3.

The bumper garnish 3 is curved in a generally concave shape when viewed from above, and is disposed in the vehicle width direction along the upper edge of the front bumper 4, The bumper garnish 3 has right and left ends in the vehicle width direction, and the right and left ends extend rearward toward the rear side of the vehicle.

The bumper garnish 3 according to this embodiment is made of plastic. The bumper garnish 3 includes a central portion 3a disposed in the middle of the bumper garnish 3 in the vehicle width direction, and a right end portion 3b and a left end portion 3b integral with the central portion 3a and extending in the lateral directions to the positions substantially corresponding to outer edges of the bumper garnish 3 in the vehicle width direction.

The right and left end portions 3b, 3b are smaller in dimension in the vertical direction of the vehicle than the central portion 3a. Further, the right and left end portions 3b; 3b are curved and tapered toward the rear side of the vehicle.

The right and left end portions 3b, 3b are formed to be deflectable in the direction of arrow W that is the vehicle width direction as well as in the direction of arrow H that is the upper-lower direction of the vehicle.

Figure 2:
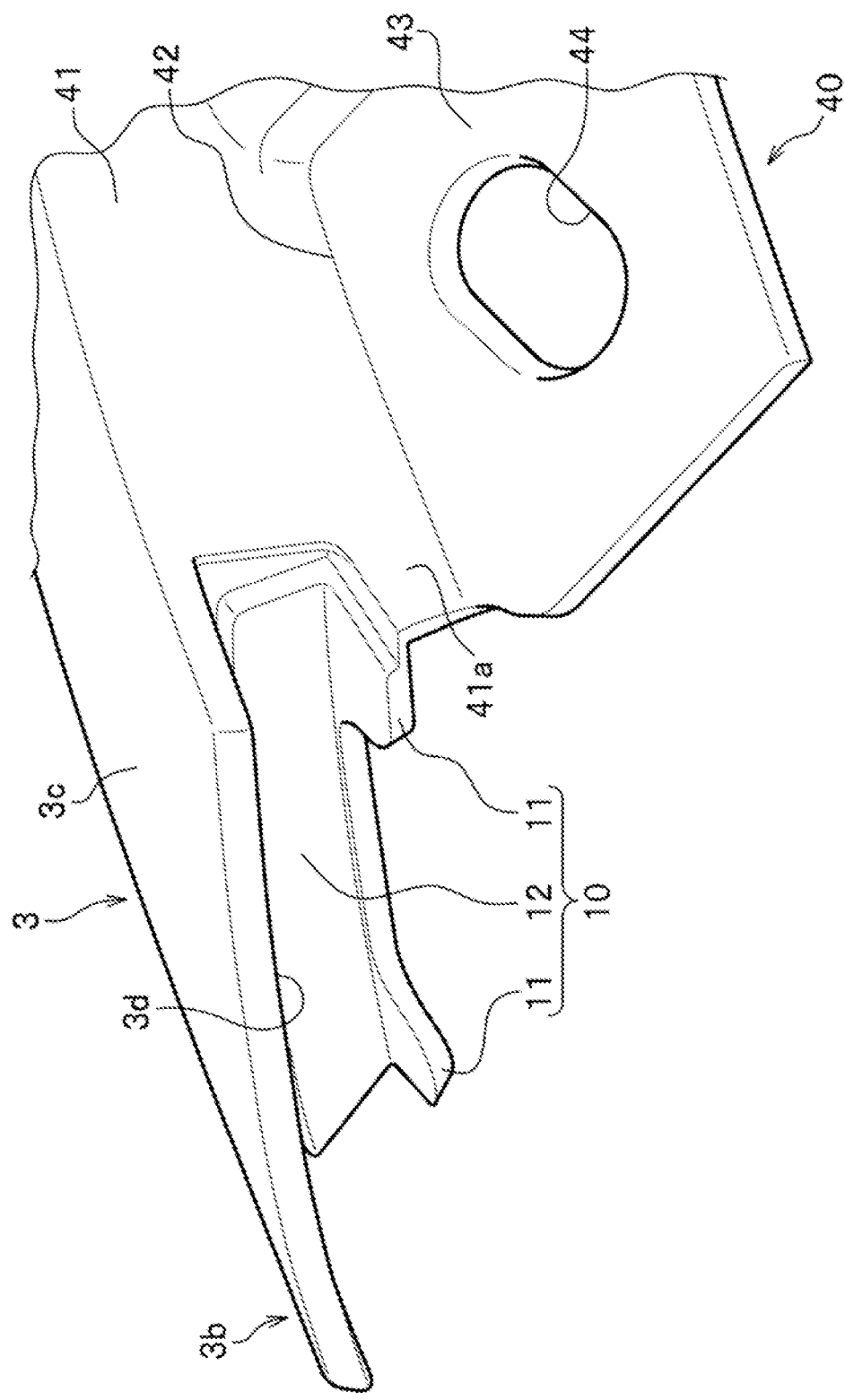
FIG. 2 is a perspective view illustrating a structure at an end portion of a bumper garnish in the connecting structure for exterior members according to the embodiment.

Each of the right end portion 3b and the left end portion 3b of the bumper garnish 3 has an engaging portion 10 as shown in FIG. 2. FIG. 2 illustrates the engaging portion 10 provided on the left end portion 3b of the vehicle, and the right end portion 3b of the vehicle and the engaging portion 10 provided on the right end portion 3b are not shown in FIG. 2. Although not described in the drawings, the engaging portion 10 provided on the right end portion 3b and the engaging portion 10 provided on the left end portion 3b are substantially the same in configuration and are arranged substantially symmetrically.

The engaging portion 10 according to this embodiment includes a base portion 12 extending downward from a lower surface of the end portion 3b of the bumper garnish 3 and having a generally rectangular shape when viewed from the front side, and a pair of engagement projections 11, 11 jutting out from the base portion 12 toward the rear side of the vehicle.

The engagement projections 11, 11 are projections jutting out from right and left end portions of the lower edge of the base portion 12 toward the fender 6 (in a rearward direction of the vehicle). The engagement projections 11, 11 are provided in pair and disposed spaced apart by a predetermined distance along the rear edge of the end portion 3b. The engagement projections 11, 11 extend in a direction orthogonal to the base portion 12.

The engagement projections 11, 11 and the base portion 12 are integrally formed to provide a generally L-shaped configuration when viewed from side.

Further, the engagement projection 11 according to this embodiment has a thin plate-like tongue shape whose width dimension narrows toward the distal end and thus has a generally trapezoidal shape when viewed in plan view. The engagement projections 11, 11 are spaced apart from the lower surface of the end portion 3b and formed within the range of the vertical thickness of the bumper garnish 3.

As seen in FIG. 1, the connecting structure for exterior members according to this embodiment includes a pair of right and left fenders 6, 6 as an example of second exterior members disposed at the front portion 2 of the vehicle body 1. The fender 6 is disposed right above the front wheel house 5 and extends to the front pillar.

The fender 6 includes a panel-like main body portion 6b, a front end portion 6a extending from the main body portion Ob in the longitudinal (front-rear) direction of the vehicle, and a rear edge portion od extending upward from the main body portion 6b along the front pillar 7.

The front end portion 6a of the fender 6 extends toward the front side of the vehicle and is disposed adjacent to the bumper garnish 3. A parting line 8 (see the position indicated by the imaginary line of FIG. 4) is present at a portion where the front end portion 6a of the fender 6 and the end portion 3b of the bumper garnish 3 abut on each other when the bumper garnish 3 and the fender 6 are fitted on the vehicle body 1. The parting line 8 is a substantially straight line disposed between the end portion 3b and the front end portion 6a and extending in the vehicle inward-outward direction (lateral direction).

Each of the right and left fenders 6, 6 has an interconnecting member 20 (see FIG. 3) at the front end portion 6a thereof. The interconnecting member 20 is configured to connect the bumper garnish 3 and the fender 6 and to fix the bumper garnish 3 and the fender 6 to the vehicle body 1. For this reason, as seen in FIG. 4, the interconnecting member 20 according to this embodiment is fixed in advance to the front end portion 6a of the fender 6 and integrated with the fender 6.

Next, the structure of the interconnecting member 20 will be described mainly with reference to FIG. 3.

Figure 3:
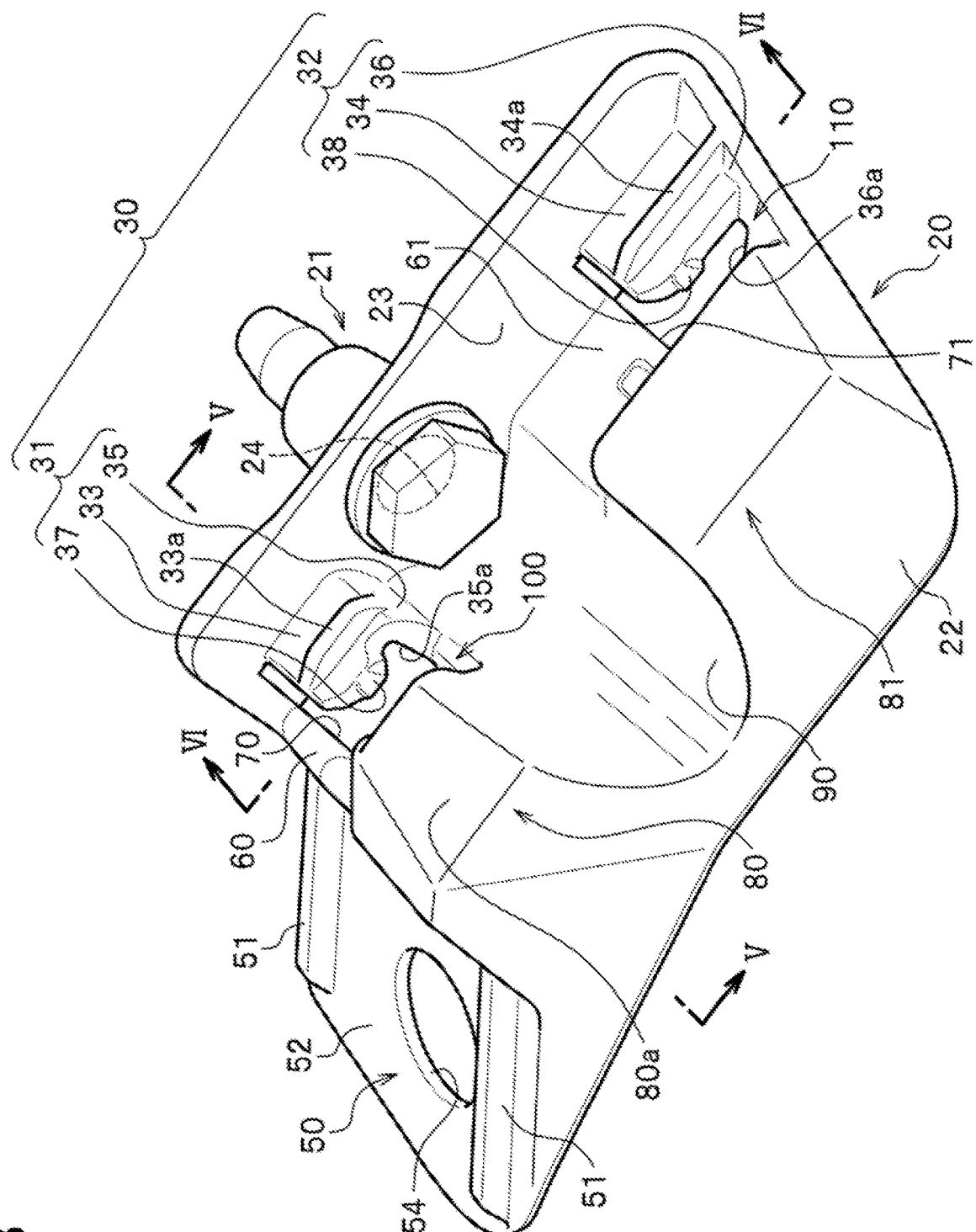
FIG. 3 is a perspective view explaining a structure of an interconnecting member in the connecting structure for exterior members according to the embodiment.
Figure 4:
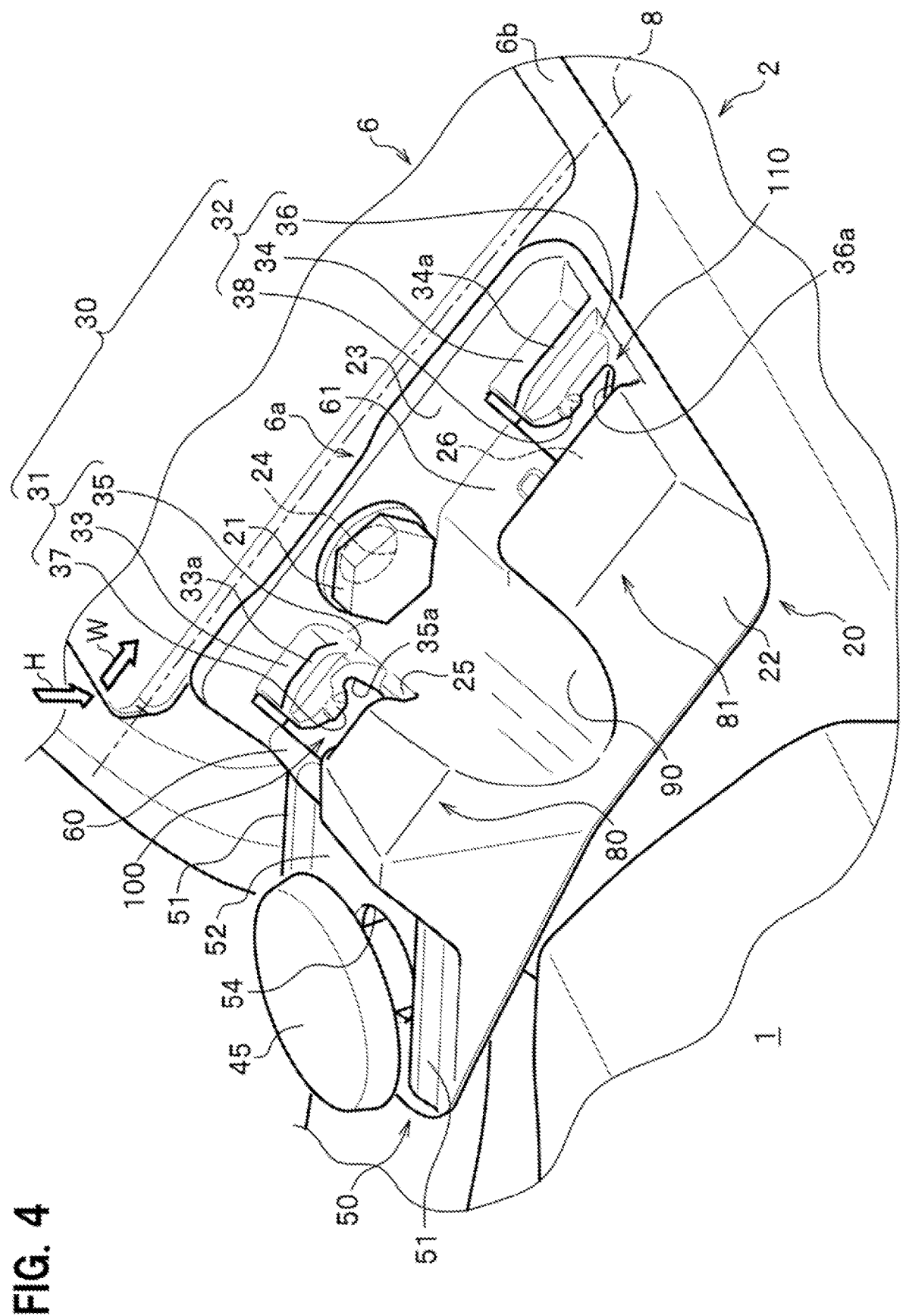
FIG. 4 is a perspective view showing a state in which an engaging portion of the bumper garnish is slidingly inserted into an engaged portion of the interconnecting member attached to an end portion of a fender in the connecting structure for exterior members according to the embodiment.

As seen in FIG. 3, the interconnecting member 20 mainly includes a body portion 22 having a generally rectangular shape when viewed from above, and a rear wall portion 23 formed on the rear portion of the body portion 22 and having a longitudinal wall shape. The rear wall portion 23 is fixed to the front end portion 6a of the fender 6. The rear wall portion 23 is provided with an inner engaged portion 31 and an outer engaged portion 32 as an example of an engaged portion 30.

Figure 6:
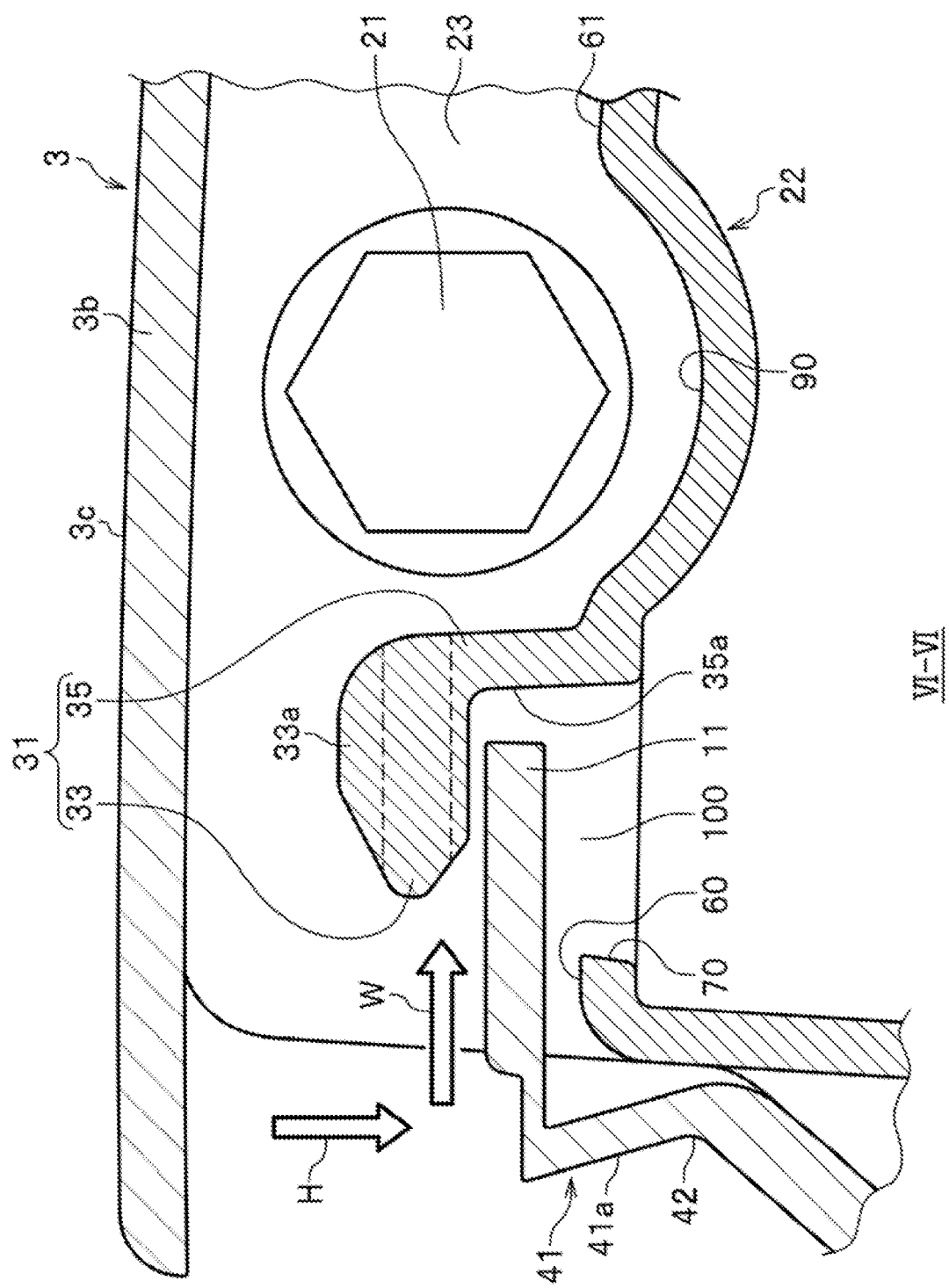
FIG. 6 is a sectional view corresponding to the section taken along the line VI-VI of FIG. 3 for explaining a state in which the end portion of the bumper garnish is engaged with the interconnecting member in the connecting structure for exterior members according to the embodiment.

Each of the inner engaged portion 31 and the outer engaged portion 32 is formed in the shape of a generally L-shaped hook when viewed from the front side (see FIG. 6). Further, the inner engaged portion 31 and the outer engaged portion 32 are spaced apart from each other in the vehicle width direction at the same interval as that of the engagement projections 11, 11, and a pair of the engaged portions 31, 32 are provided.

As seen in FIG. 4, the engaging portion 10 provided on the end portion 3b of the bumper garnish 3 is relatively slid along the parting line 8 in the vehicle outward direction (in the direction of arrow W) with respect to the engaged portion 30 of the fender 6. This causes the engaging portion 10 and the engaged portion 30 to be brought into engagement with each other in a direction intersecting a sliding direction of the engaging portion 10.

Accordingly, the engagement projections 11, 11 (see FIG. 2) formed at the engaging portion 10 of the bumper garnish 3 are respectively engaged with the inner engaged portion 31 and the outer engaged portion 32, so that the end portion 3b of the bumper garnish 3 is brought into abutment with and thus attached to the front end portion 6a of the fender 6.

As seen in FIG. 3, each of the inner engaged portion 31 and the outer engaged portion 32 according to this embodiment has an upper wall portion 33, 34 and a support wall 35, 36. The upper wall portion 33, 34 and the support wall 35, 36 have respective side edges connected to the rear wall portion 23 and thus protrude integrally from the rear wall portion 23 to form a generally L-shaped cross-section.

The upper wall portions 33, 34 are spaced apart from the body portion 22 by a predetermined distance. Each of the upper wall portions 33, 34 is formed to have an eaves shape. A reinforcement rib 33a, 34a protrudes upward from the upper surface of the upper wall portion 33, 34.

A projecting portion 37, 38 is formed on the front side edge of the upper wall portion 33, 34 to protrude frontward toward the front side of the vehicle. The projecting portion 37, 38 is configured to point contact with the base portion 12, 12 of the engaging portion 10 when the engaging portion 10 and the engaged portion 30 are in an engaged state (see FIG. 5I.

Further, an opening 70, 71 is formed in the body portion 22 under the upper wall portion 33, 34. The openings 70, 71 are formed in a die-cutting direction when the interconnecting member 20 is manufactured. In the engaged state, the lower sides of the engagement projections 11 are open by the opening 70, 71.

Further, the support wall 35, 36 according to this embodiment has side edges connected to the body portion 22, the upper wall portion 33, and the rear wall portion 23. The support wall 35, 36 has an inner surface in the vehicle width direction, and a receiving surface 35a, 36a is formed on the inner surface.

As seen in FIG. 6, the receiving surfaces 35a, 36a are disposed such that when the engagement projections 11, 11 are slid and inserted in the direction of arrow W along the parting line 8, the respective engagement projections 11, 11 come into contact substantially simultaneously with the corresponding receiving surfaces 35a, 36a. With this configuration, the receiving surfaces 35a, 36a stop the end portion 3b of the bumper garnish 3 at the normal fixing position and thus prevent the end portion 3b from moving further outward in the Vehicle width direction (in the direction of arrow W of FIG. 6).

As seen in FIG. 3, when viewed from above, surface contact portions 60, 61 are formed on the upper surface of the body portion 22 of the interconnecting member 20 at positions closer to the interior of the vehicle than the inner engaged portion 31 and the outer engaged portion 32.

The surface contact portions 60, 61 are formed as generally flat surfaces to receive the lower surfaces of the engagement projections 11, 11 when the engagement projections 11, 11 are inserted in the direction of arrow H of FIG. 4. This makes it possible to position the engagement projections 11, 11 in the vertical direction.

In the abutment state, the engagement projections 11, 11 are stably positioned in the vertical direction. Accordingly, sliding the engagement projections 11, 11 on the upper surfaces of the surface contact portions 60, 61 in the direction of arrow W of FIG. 4 causes the engagement projections 11, 11 to be inserted respectively into a lower space formed under the upper wall portion 33 of the inner engaged portion 31 and a lower space formed under the upper in wall portion 34 of the outer engaged portion 32 with ease.

Further, the interconnecting member 20 according to this embodiment has a pair of right and left bulging portions 80, 81 formed on the body portion 22. The bulging portions 80, 81 are formed to bulge upward toward the upper side of the vehicle. The upper surface 80a of the bulging portion 80 is located at the same height or higher than the upper wall portion 33 in the vertical direction of the vehicle.

Figure 5:
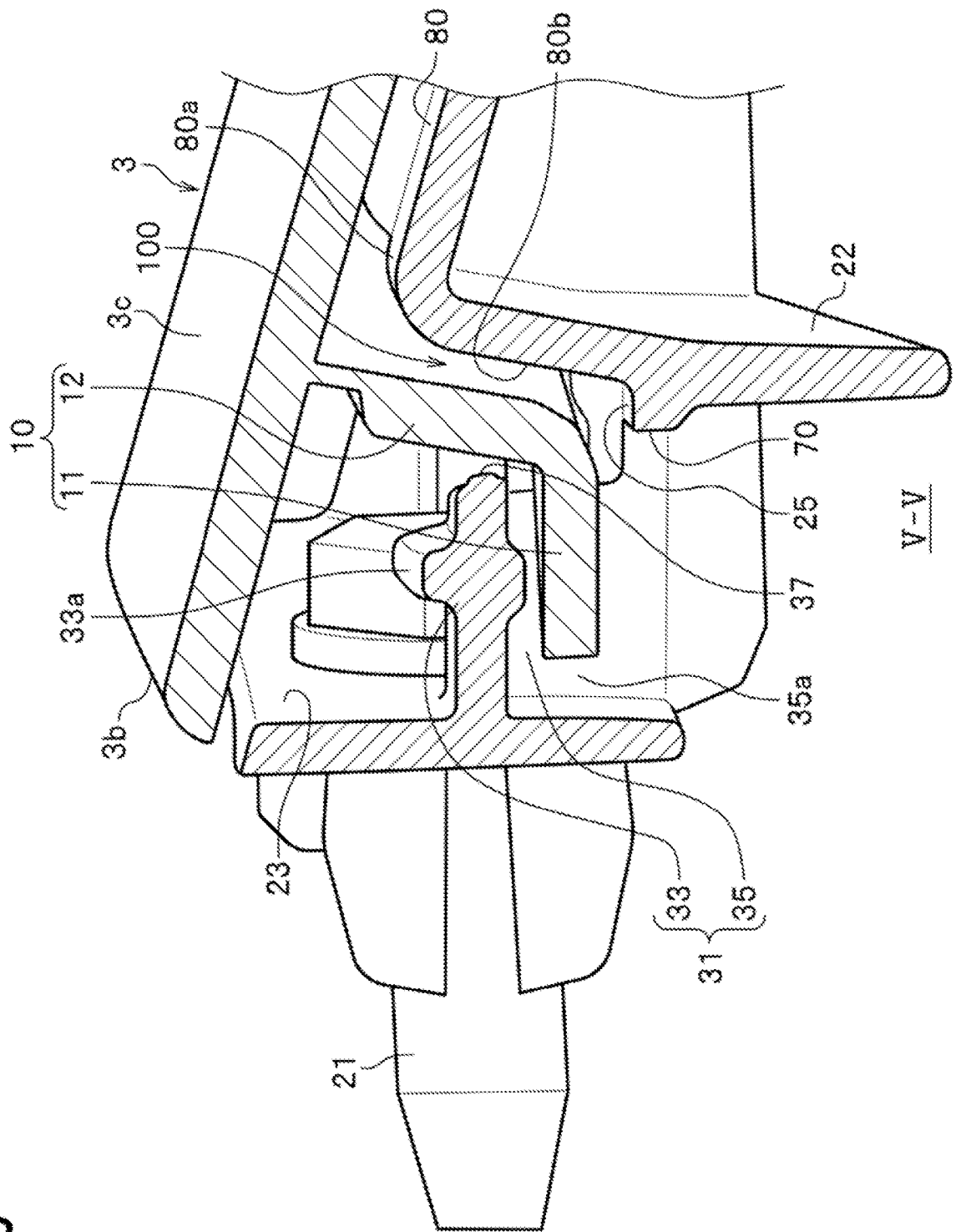
FIG. 5 is a sectional view corresponding to the section taken along the line V-V of FIG. 3 for explaining a state in which the end portion of the bumper garnish is engaged with the interconnecting member in the connecting structure for exterior members according to the embodiment.

As seen in FIG. 5, insertion grooves 25 are formed respectively between the bulging portion 80 and the inner engaged portion 31 and between the bulging portion 81 and the outer engaged portion 32. According to this embodiment, an L-shaped space 100 is formed on the side of the inner engaged portion 31 along the lower surface of the upper wall portion 33 and a side wall 80b of the bulging portion 80. Similarly, as seen in FIG. 3, an L-shaped space 110 is formed on the side of the outer engaged portion 32 along the lower surface of the upper wall portion 34 and an inner wall of the bulging portion 81.

When the engaging portion 10 is inserted in the direction of arrow W (see FIG. 4) into the respective spaces 100, 110, the engagement projections 11, 11 are slid and guided to an attachment position at which the engagement projections 11, 11 are brought into contact with the receiving surfaces 35a, 36a.

The engagement projections 11, 11 are slidingly guided along the side walls Sob of the bulging portions 80, 81, so that the movement of the end portion 3b toward the front side of the vehicle is restricted. This can prevent the parting line 8 from widening in the longitudinal direction of the vehicle.

As seen in FIG. 3, a bolt groove portion 90 is formed between the pair of bulging portions 80, 81 of the body portion 22 so that inserting a fastening bolt 21 into a bolt insertion hole 24 is not interrupted.

Further, the rear wall portion 23 integrally extends from the body portion 22 of the interconnecting member 20 in the vertical direction. As seen in FIG. 4, when the interconnecting member 20 is attached to the fender 6, the rear wall portion 23 abuts on a flat surface formed on the front end portion 6a.

The bolt insertion hole 24 is formed in a central portion of the rear wall portion 23 that is located generally center in the vehicle width direction. The fastening bolt 21 is inserted into the bolt insertion hole 24 through the bolt, groove portion 90 and threadedly engaged with an internal thread portion (not shown) formed in the front end portion 6a of the fender 6.

Accordingly, the interconnecting member 20 is fastened to the front end portion 6a of the fender 6 and is integrated therewith in advance.

As seen in FIG. 2, the connecting structure for exterior members according to this embodiment includes a garnish-side superposed portion 40 provided on the bumper garnish 3. Further, the interconnecting member 20 includes a fender-side superposed portion 50. The connecting structure for exterior members is configured such that when the engaging portion 10 and the engaged portion 30 are engaged with each other, the garnish-side superposed portion 40 and the fender-side superposed portion 50 are superposed one on another.

To be more specific, as seen in FIG. 2, the bumper garnish 3 has a vertical wall portion 41 and a planar anchor portion 43 extending in the vehicle width direction from a lower end 42 of the vertical wall portion 41. The garnish-side superposed portion 40 is formed on the planar anchor portion 43. The fixed planar portion 43 has a generally square shape when viewed in plan view, and a through hole 44 is formed in a central portion of the planar anchor portion 43. The through hole 44 is formed as a long hole so that position adjustment can be performed while a clip 45 (see FIG. 4) as a fixing member fixed to the vehicle body 1 is inserted into the through hole 44.

Further, the engagement projection 11 of the engaging portion 10 that is located laterally inward in the vehicle width direction is connected to the connecting, portion 41a of the vertical wall portion 41.

Further, as seen in FIG. 3, the interconnecting member 20 has a planar anchor portion 52 in the shape of a flat plate. The planar anchor portion 52 extends from an inner surface of the body portion 22 that is located laterally inward in the vehicle width direction. Provided on the fixed planar portion 52 is the fender-side superposed portion 50 having a generally square shape when viewed in plan view. The fender-side superposed portion 50 is supported between a pair of support projections 51, 51. A through hole 54 is formed in a central portion of the planar anchor portion 52. The through hole 54 is formed as a circular hole. While the garnish-side superposed portion 40 and the fender-side superposed portion 50 are supported, a clip 45 as a fixing member is inserted into the through hole 54 to fix the garnish-side superposed portion 40 and the fender-side superposed portion 50 to the vehicle body 1.

Next, the operation and advantageous effects of the connecting structure for exterior members according to this embodiment will be described below.

According to the connecting structure for exterior members as described in this embodiment, as seen in FIG. 1, the fender 6 is provided at the front portion 2 of the vehicle body 1, and the bumper garnish 3 is fixed to the vehicle body 1 with the end portion 3b of the bumper garnish 3 abutting on the front end portion 6a of the fender 6.

First, the engaging portion 10 provided on the end portion 3b of the bumper garnish 3 (see FIG. 2) is inserted into the engaged portion 30 of the interconnecting member 20 fixed to the vehicle body 1.

At this time, as shown by arrow H of FIG. 4, the end portion 3b of the bumper garnish. 3 is pushed downward at an appropriate position, and then slid outward in the vehicle width direction as shown by the arrow W.

Accordingly, as seen in FIG. 5, the engagement projection 11 and the base portion 12 of the engaging portion 10 are slid in the generally L-shaped space 100 until the engagement projection 11 abuts on the receiving surface 35a of the support wall 35 (see FIG. 6).

This can cause the engagement projections 11, 11 to be positioned under the corresponding lower surfaces of the upper wall portions 33, 34. Therefore, in addition to the receiving surface 35a stopping the movement in the vehicle width direction, the upper wall portions 33, 34 can prevent the engaging portion 10 from moving upward in the vertical direction of the vehicle.

Next, the through hole 44 formed in the planar anchor portion 43 of the bumper garnish 3 (see FIG. 2) is aligned with the through hole 54 formed in the planar anchor portion 52 of the interconnecting member 20 (see FIG. 3).

After that, as seen in FIG. 4, a distal end of the clip 45 is inserted into a clip fixing hole (not shown) of a bearing surface provided on the front portion 2 of the vehicle body 1.

According to the connecting structure for exterior members of this embodiment, the front end portions 6a of the fender 6 and the right and left end portions 3b, 3b of the bumper garnish 3 are fitted in the front portion 2 of the vehicle body 1 with ease.

Further, the end portion 3b oldie bumper garnish 3 can be positioned while being slid along the parting line S.

This can reduce assembly tolerances as compared with the conventional configuration in which positioning is performed in a direction orthogonal to the parting line 8.

Further, it is possible to reduce the thickness of the bumper garnish 3 at the connecting portion thereof as compared with an alternative configuration in which a locking claw protrudes downward from the lower surface of the bumper garnish 3 to engage with a receiving portion of the fender 6.

Further, it is not necessary to provide a protruding portion (e.g. locking claw) jutting out from the lower surface. Therefore, it is not necessary to increase the thickness dimension of the bumper garnish 3. This can suppress interference with the interconnecting member 20 and other members.

Further, as shown in the assembled state of FIG. 5, the connecting structure for exterior members according to this embodiment is configured such that the projecting portion 37 formed on the front side edge of the upper wall portion 33 is brought into contact with the side surface of the base portion 12 of the engaging portion 10.

This can suppress the movement of the end portion 3b in the rearward direction of the vehicle, so that the positioning accuracy is further improved.

The engaged portion 30 according to this embodiment has the generally L-shaped space 100 between the bulging portions 80, 81 through which space the engaging portion 10 is slidably moved. With this configuration, the engaging portion 10 can slide smoothly in the direction of arrow W of FIG. 4 while being guided in the L-shaped space 100.

Further, the base portion 12 of the engaging portion 10 abuts on the side walls Sob of the bulging portions 80, 81 at the fixing position shown in FIG. 5. This can suppress the movement of the end portion 3b in the forward direction of the vehicle, so that the positioning accuracy is further improved.

Further, the gap is less likely to be enlarged in the direction intersecting the parting line 8. Therefore, tolerances of the fender 6 and the bumper garnish 3 and/or assembly tolerances upon attachment of the fender 6 and the bumper garnish 3 can be absorbed.

The connecting structure for exterior members according to this embodiment includes the surface contact portions 60, 61 (see FIG. 3) formed on the upper wall portions 33, 34 at positions closer to the interior of the vehicle when viewed from above the vehicle.

Each of the surface contact portions 60, 61 is formed in a generally flat shape or a protrusively curved shape. The surface contact portions 60, 61 contact the lower sides of the engagement projections 11, 11 when the engagement projections 11, 11 are fitted in the direction of arrow H of FIG. 6 at a position just in front of the engaged portion 30, so that the downward movement of the engagement projections 11, 11 are stopped by the surface contact portions 60, 61.

In this surface contact state, the end portion 3b is stably supported. While the end in portion 3b is stably supported, the engagement projections 11, 11 are slid on the upper surfaces of the surface contact portions 60, 61 along the parting line 8 in the direction of arrow W of FIG. 4.

When the engagement projections 11, 11 are inserted into die engaged portion 30, the engagement projections 11, 11 are brought into contact with the corresponding upper wall portions 33, 34 that are positioned right above the engagement projections 11, 11. This can prevent the engagement projections 11, 11 from moving upward from the engaged positions. Therefore, the outer surface of the end portion 3b does not float above the outer surface of the fender 6.

As described above, the connecting structure for exterior members according to this embodiment is configured such that the engagement projections 11, 11 are inserted into the lower sides of the upper wall portions 33, 34 of the engaged portion 30. Accordingly, positioning of the end portion 3b in the vertical direction can be performed with ease.

At this time, as shown by the imaginary line of FIG. 1, the end portions 3b, 3b of the bumper garnish 3 deflect and deform in the vehicle width direction (direction of arrow W) and in the vertical direction of the vehicle (direction of arrow H). The engaging portion 10 is fitted with ease by sliding it along the parting line 8, so that an excellent assembling property can be provided.

Further, according to this embodiment, the receiving surfaces 35a, 36a are provided on the support walls 35, 36. As seen in FIG. 6, the receiving surfaces 35a, 36a are formed such that when the engagement projections 11, 11 are slid and inserted along the parting line 8 in the direction of arrow W, the engagement projections 11, 11 are brought into contact substantially simultaneously with the receiving surfaces 35a, 36a. With this configuration, the receiving surfaces 35a, 36a prevent the bumper garnish 3 from moving outward in the vehicle width direction (direction of arrow W of FIG. 6).

Therefore, the end portion 3b of the bumper garnish 3 is accurately positioned, with respect to the front end portion 6a of the fender 6.

Further, when the end portion 3b of the bumper garnish 3 is engaged with and positioned with respect to the front end portion 6a of the fender 6, the garnish-side superposed portion 40 provided on the bumper garnish 3 and the fender-side superposed portion 50 provided on the fender 6 are superposed one on another.

Accordingly, the fixed planar portion 43 and the fixed planar portion 52 are overlapped each other, and the position of the through hole 44 and the position of the through hole 54 coincide with each other. This can facilitate insertion of the clip 45 (see FIG. 4) through the through holes 44, 54 to fix the fender 6 and the bumper garnish 3 to the vehicle body 1.

While the bumper garnish 3 is reliably fixed using the clip 45, the bumper garnish 3 is easily disassembled by removing the clip 45. This results in excellent workability for maintenance.

Further, according to this embodiment, as seen in FIG. 4, the interconnecting member 20 formed as a discrete member separate from the fender 6 is fixed in advance to the front end portion 6a of the fender 6 and integrated with the fender 6.

Therefore, it is possible to improve dimensional accuracy and productivity of the fender 6 and the bumper garnish 3 by the engaged portion 30 formed on the interconnecting member 20.

Further, according to this embodiment, the interconnecting member 20 and the bumper garnish 3 are attached to the fender 6 that is an exterior member having a relatively higher attachment accuracy than other exterior members. Therefore, the assembling accuracy of the bumper garnish 3 can be favorably improved.

As described above, according to the connecting structure for exterior members of this embodiment, sliding one of the fender 6 and the bumper garnish 3 relative to the other one of the fender 6 and the bumper garnish 3 along the parting line 8 in the direction of arrow W of FIG. 4 causes the fender 6 and the bumper garnish 3 to be brought into engagement with each other in the direction (longitudinal direction of the vehicle) intersecting the sliding direction (direction of arrow W).

According to this embodiment, it is possible to provide a connecting structure for exterior Members, which is easy to assemble and which can reduce the assembling tolerances. This leads to practically advantageous effects.

The present invention is not limited to the above-described embodiment, and various changes or modifications may be made where appropriate. It is to be understood that the above-described embodiment has been provided for illustration purpose only to easily understand the present invention and that the present invention is not necessarily includes all the elements described in the embodiment. Further, one or more elements of one embodiment may be replaced with one or more corresponding elements of another embodiment, or one or more elements described in another embodiment may be added to the configuration of one embodiment. Further, it is to be understood that various configurations of the embodiments may be changed or modified by partly deleting, adding or replacing one or more elements. For example, the above-described embodiment may be modified as follows.

Although the connecting structure fir exterior members according to this embodiment includes the engaged portion 30 provided OA the interconnecting member 20, the present invention is not limited to this specific configuration. For example, the engaged portion 30 may be directly provided on the fender 6 without using the interconnecting member 20. In other words, as long as one of the first exterior member and the second exterior member is provided with an engaging portion and the other one of the first exterior member and the second exterior member is provided with an engaged portion, the shape, the number and the material of each of the engaging portion and the engaged portion are not limited to those described in the above embodiment.

Further, as seen in FIG. 1, the connecting structure for exterior members according to the present invention has been applied to the front portion 2 of the vehicle body 1, at which portion the end portion 3b of the bumper garnish 3 abuts on and is fixed to the front end portion 6a of the fender 6. However, the present invention is not limited to this specific configuration. For example, the present invention may be applied to a connecting structure for any exterior members, such as an outer plate, a bumper, a lamp body, another garnish and a molding. Further, the shape, the number and the material of exterior members are not limited.

Further, the connecting structure for exterior members according to this embodiment employs the bumper garnish 3 as a garnish that is an example of the first exterior member and the fender 6 as an example of the second exterior member, respectively. However, the present invention is not limited to this specific configuration, and the fender may be used as an example of the first exterior member and the garnish may be used as an example of the second exterior member.

What is claimed is:

1. A connecting structure for exterior members comprising:
   bumper garnish made of plastic and curved in a concave shape when viewed from above, the bumper garnish being disposed in a vehicle width direction of a vehicle along an upper edge of a front bumper of a vehicle body;
   pair of fenders disposed adjacent to the bumper garnish;
   an engaging portion provided on each of a right end portion and a left end portion of the bumper garnish, the right end portion and the left end portion being formed to be smaller in dimension in a vertical direction of the vehicle than a central portion of the bumper garnish and to be curved and tapered toward a rear side of the vehicle; and
   an engaged portion provided on a front end portion of each of the fenders,
   wherein the connecting structure has a parting line formed between the bumper garnish and each fender and extending in a vehicle inward-outward direction at a portion where the front end portion of the fender and each of the right and the left end portion of the bumper garnish abut on each other when the bumper garnish and the fender are adjacent to each other in a front-rear direction and fitted on the vehicle body, and
   wherein sliding each of the right and the left end portion of the bumper garnish relative to the front end portion of the fender along a direction in which the parting line extends causes the engaging portion and the engaged portion to be brought into engagement with each other in a direction intersecting a sliding direction of each of the right and the left end portion.

2. The connecting structure according to claim 1, wherein one of the bumper garnish and the fender has a projecting portion, and the projecting portion point contacts with the other one of the bumper garnish and the fender when the engaging portion and the engaged portion are in an engaged state.

3. The connecting structure according to claim 1, wherein the bumper garnish and the fender have a respective surface contact portion, and the surface contact portion of the bumper garnish and the surface contact portion of the fender are brought into surface contact with each other in a direction intersecting the sliding direction prior to engagement of the engaging portion and the engaged portion.

4. The connecting structure according to claim 1, wherein the engaging portion is a projection jutting out from one of the bumper garnish and the fender toward the other one of the bumper garnish and the fender, and
wherein the other one of the bumper garnish and the fender has a receiving surface in contact with the projection in the sliding direction when the projection is relatively slid along the parting line.

5. The connecting structure according to claim 1, wherein the bumper garnish and the fender have a respective superposed portion configured to be superposed one on top of another when the engaging portion and the engaged portion are engaged with each other, and
wherein each superposed portion has a through hole, through which a fixing member is fixed to the vehicle body.

6. The connecting structure according to claim 1, wherein at least one of the bumper garnish and the fender has the engaging portion, and an interconnecting member formed as a discrete member separate from the fender is provided.

7. A connecting structure for exterior members comprising:
a first exterior member provided on a vehicle body of a vehicle, the first exterior member being curved in a concave shape when viewed from above;
a second exterior member disposed adjacent to the first exterior member;
an engaging portion provided on each of a right end portion and a left end portion of the first exterior member, the right end portion and the left end portion being formed to be smaller in dimension in a vertical direction of the vehicle than a central portion of the first exterior member and to be curved and tapered toward a rear side of the vehicle; and
an engaged portion provided on the second exterior member,
wherein the connecting structure has a parting line formed between the first exterior member and the second exterior member by disposing the second exterior member on the vehicle body adjacent to the first exterior member,
wherein an interconnecting member formed as a discrete member separate from the first exterior member and the second exterior member is provided, and the interconnecting member includes a body portion and a wall portion formed on an end portion of the body portion and having a longitudinal wall shape,
wherein the interconnecting member is fixed to an end portion of the second exterior member, and the engaged portion is provided on the wall portion of the interconnecting member,
wherein the first exterior member and the interconnecting member have a respective superposed portion configured to be superposed one on top of another when the engaging portion and the engaged portion are engaged with each other, and each superposed portion has a through hole, through which a fixing member is fixed to the vehicle body, and
wherein deflecting the right end portion and the left end portion of the first exterior member to slide the engaging portion relative to the engaged portion of the interconnecting member along the parting line causes the engaging portion and the engaged portion to be brought into engagement with each other in a direction intersecting a sliding direction of the engaging portion.

8. The connecting structure according to claim 7, wherein one of the first exterior member and the interconnecting member has a projecting portion, and the projecting portion point contacts with the other one of the first exterior member and the interconnecting member when the engaging portion and the engaged portion are in an engaged state.

9. The connecting structure according to claim 7, wherein the first exterior member and the interconnecting member have a respective surface contact portion, and the surface contact portion of the first exterior member and the surface contact portion of the interconnecting member are brought into surface contact with each other in a direction intersecting the sliding direction prior to engagement of the engaging portion and the engaged portion.

10. The connecting structure according to claim 7, wherein the engaging portion is a projection jutting out from the first exterior member toward the second exterior member, and
wherein the interconnecting member has a receiving surface in contact with the projection in the sliding direction when the projection is relatively slid along the parting line.

11. The connecting structure according to claim 7, wherein one of the first exterior member and the second exterior member is a fender, and the other one of the first exterior member and the second exterior member is a garnish.

* * * * *